(12) United States Patent
Nakata

(10) Patent No.: US 11,178,339 B2
(45) Date of Patent: Nov. 16, 2021

(54) CONTROL OF AN ILLUMINATOR

(71) Applicant: Axis AB, Lund (SE)

(72) Inventor: Shota Nakata, Tokyo (JP)

(73) Assignee: AXIS AB, Lund (SE)

( * ) Notice: Subject to any disclaimer, the term of this patent is extended or adjusted under 35 U.S.C. 154(b) by 34 days.

(21) Appl. No.: 16/814,148

(22) Filed: Mar. 10, 2020

(65) Prior Publication Data
US 2020/0296276 A1 Sep. 17, 2020

(30) Foreign Application Priority Data

Mar. 14, 2019 (EP) ..................................... 19162826

(51) Int. Cl.
*H04N 5/00* (2011.01)
*H04N 5/235* (2006.01)
*H04N 5/21* (2006.01)
*H04N 5/225* (2006.01)

(52) U.S. Cl.
CPC ............. *H04N 5/2354* (2013.01); *H04N 5/21* (2013.01); *H04N 5/2256* (2013.01)

(58) Field of Classification Search
CPC ...................................................... H04N 5/00
See application file for complete search history.

(56) References Cited

U.S. PATENT DOCUMENTS

| | | | |
|---|---|---|---|
| 5,294,989 A | 3/1994 | Moore et al. | |
| 7,045,759 B2 | 5/2006 | Hara et al. | |
| 10,148,887 B2 | 12/2018 | Terada et al. | |
| 2002/0105581 A1* | 8/2002 | Masaki | H04N 5/23241 348/229.1 |
| 2005/0008243 A1* | 1/2005 | Fujino | H04N 1/2158 382/254 |
| 2007/0024707 A1* | 2/2007 | Brodsky | G11B 27/28 348/143 |

(Continued)

FOREIGN PATENT DOCUMENTS

| | | |
|---|---|---|
| GB | 2495807 A | 4/2013 |
| JP | 2004-297645 A | 10/2004 |

(Continued)

OTHER PUBLICATIONS

Korean Office Action dated Feb. 15, 2021 for Korean Patent Application No. 10-2020-0004830.

(Continued)

*Primary Examiner* — Maryam A Nasri
(74) *Attorney, Agent, or Firm* — Volpe Koenig

(57) ABSTRACT

A method for controlling an illuminator illuminating a scene monitored by a camera comprises determining whether an object of interest is present in the scene; upon at least one object of interest being determined to be present in the scene, setting a saturation threshold to a first value; or upon no object of interest being determined to be present in the scene, setting the saturation threshold to a second value being lower than the first value. The method further comprises identifying saturated pixels in an image of the scene captured by the camera; determining a ratio between a saturated area comprising the saturated pixels and a total area of the image; and upon the ratio being above the saturation threshold, decreasing a degree of illumination from the illuminator.

15 Claims, 7 Drawing Sheets

(56) References Cited

U.S. PATENT DOCUMENTS

| | | | |
|---|---|---|---|
| 2008/0106422 A1* | 5/2008 | Sparks | E04H 4/14 |
| | | | 340/573.6 |
| 2009/0003678 A1 | 1/2009 | Cutler | |
| 2014/0118540 A1 | 5/2014 | Martin | |
| 2014/0203629 A1* | 7/2014 | Hoffman | G01J 3/50 |
| | | | 307/9.1 |
| 2017/0118459 A1* | 4/2017 | Kim | G01S 17/894 |
| 2018/0224545 A1* | 8/2018 | Price | G01S 7/4814 |

FOREIGN PATENT DOCUMENTS

| | | |
|---|---|---|
| JP | 2005-323180 A | 11/2005 |
| JP | 2006-319450 A | 11/2006 |
| JP | 2014-098859 A | 5/2014 |
| JP | 2015-126250 A | 7/2015 |
| JP | 2017-139560 A | 8/2017 |
| KR | 10-2017-0048972 A | 5/2017 |
| WO | 02/056584 A1 | 7/2002 |
| WO | 2015/114121 A1 | 8/2015 |
| WO | 2018/123429 A1 | 7/2018 |

OTHER PUBLICATIONS

Extended European Search Report dated Sep. 30, 2019 for the European Patent Application No. 19162826.2.
Japanese Office Action dated Jun. 15, 2021 for Japanese Patent Application No. 2020-039438.

* cited by examiner

CONTROL OF AN ILLUMINATOR

TECHNICAL FIELD

The present invention relates to controlling an illuminator illuminating a scene monitored by a camera. Also a controller configured to control the illuminator is presented.

BACKGROUND

When monitoring a scene using a camera, it is at times necessary to add light to the scene in order to enable capturing of images of sufficient quality. Illuminators may be integrated in the camera, or external to the camera. The illuminators may add visible light. However, since image sensors used in cameras are generally sensitive to infrared radiation (IR) or more specifically near infrared radiation (NIR), the illuminators may advantageously add IR instead of visible light. In this manner, a sufficient amount of light may be provided for image capture, while avoiding disturbing visible light. As discussed in the following, visible light and IR will both be referred to as "light".

The amount of light added to the scene needs to be controlled such that the scene is sufficiently well lit for producing high quality images, while at the same time avoiding blinding or saturation by too much light.

As discussed in US 2014/0118540 A1, in a monitoring camera system, the power to an illuminator illuminating a scene monitored by a camera may be controlled based on the quality of the images generated by the camera. Specifically, images captured by the camera are analyzed to determine whether or not there is adequate or inadequate power to the illuminator. A controller is configured to control the power to the illuminator. Generally, the power to the illuminator is reduced in response to increasing blur in the images or halos around edges in the images.

However, reducing the power to the illuminator may limit the ability to monitor objects being distant from the camera. Hence, there is a need to optimize the control of the power to the illuminator.

SUMMARY OF THE INVENTION

Alleviating or eliminating one or more of the above-identified deficiencies in the art and disadvantages singly or in any combination and solve at least the above mentioned problem would be beneficial.

According to a first aspect a method for controlling an illuminator illuminating a scene monitored by a camera is provided. The method comprises: determining whether an object of interest is present in the scene; upon at least one object of interest being determined to be present in the scene, setting a saturation threshold to a first value; or upon no object of interest being determined to be present in the scene, setting the saturation threshold to a second value being lower than the first value. The method further comprises identifying saturated pixels in an image of the scene captured by the camera; determining a ratio between a saturated area comprising the saturated pixels and a total area of the image; and upon the ratio being above the saturation threshold, decreasing a degree of illumination from the illuminator.

Accordingly, the power of the illuminator may be controlled based on a percentage of the image in which there is saturation. Only if the percentage is above a set saturation threshold, the power of illumination is decreased. By setting the saturation threshold differently depending on whether there is an object of interest in the scene, the risk of missing to illuminate the object of interest and hence to clearly see the object of interest in subsequent images captured by the camera is reduced.

The method may further comprise: determining an object size of the at least one object of interest. Upon the object size being below a size threshold, setting the saturation threshold to the first value. Upon the object size being equal to or above the size threshold, setting the saturation threshold to a third value being lower than the first value. The third value may be equal to the second value.

By determining the saturation threshold based on the size of the detected object of interest it may be safeguarded that even if a close by object of interest is present, unnecessarily strong illumination can be avoided. Hence, upon the object of interest being big, indicating that the object of interest is close, the threshold may be set more similar to when there is no object of interest in the scene. This may lead to less saturation being accepted before the illumination is decreased compared to when a small, distant object of interest, is present. However, since the object of interest probably is close, it may be properly lit anyway.

The size of the object of interest may be determined from an image captured by the camera.

The first value may be set to be 5-25% of the total area of the image. The first value may be set to be 7-15% of the total area of the image. The first value may be set to be 10% of the total area of the image. The second value may be set to be 1-15% of the total area of the image. The second value may be set to be 3-10% of the total area of the image. The second value may be set to be 5%, of the total area of the image.

The method may further comprise: upon the ratio being below the saturation threshold by a first margin, increasing the degree of illumination from the illuminator. The size of the margin will determine how quickly the illumination is increased again once the saturation has been reduced.

The illuminator may be an IR-illuminator.

According to a second aspect a non-transitory computer readable recording medium is provided. The non-transitory computer readable recording medium has computer readable program code recorded thereon which when executed on a device having processing capability is configured to perform the method of the first aspect.

The above mentioned features of the method, when applicable, apply to this second aspect as well. In order to avoid undue repetition, reference is made to the above.

According to a third aspect a controller configured to control an illuminator illuminating a scene monitored by a camera is provided. The controller comprises a control circuit. The control circuit is configured to execute a control function configured to control a power of the illuminator. The control circuit is configured to execute an object presence function configured to determine whether an object of interest is present in the scene. The control circuit is configured to execute a saturation threshold setting function configured to: upon at least one object of interest being determined to be present in the scene, set a saturation threshold to a first value, or upon no object of interest being determined to be present in the scene, set the saturation threshold to a second value being lower than the first value. The control circuit is configured to execute a saturation identifying function configured to: identify saturated pixels in an image of the scene captured by the camera, and determine a ratio between a saturated area comprising the saturated pixels and a total area of the image. The control function is further configured to, upon the ratio being above the saturation threshold, decrease the power of the illuminator.

The control circuit may further be configured to execute an object size determining function configured to determine an object size of the at least one object of interest. The saturation threshold setting function may further be configured to: upon the object size being below a size threshold, setting the saturation threshold to the first value, or upon the object size being equal to or above the size threshold, setting the saturation threshold to a third value being lower than the first value.

The object presence function may be configured to detect whether an object of interest is present in the scene from an image captured by the camera.

The control function may be configured to, upon the ratio being below the saturation threshold, increase the power of the illuminator.

The controller may be implemented in the camera.

The above mentioned features of the method, when applicable, apply to this third aspect as well. In order to avoid undue repetition, reference is made to the above.

A further scope of applicability will become apparent from the detailed description given below. However, it should be understood that the detailed description and specific examples, while indicating preferred embodiments, are given by way of illustration only, since various changes and modifications within the scope of the teachings herein will become apparent to those skilled in the art from this detailed description.

Hence, it is to be understood that the embodiments are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The teachings will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope to the skilled person.

Figure 1A:
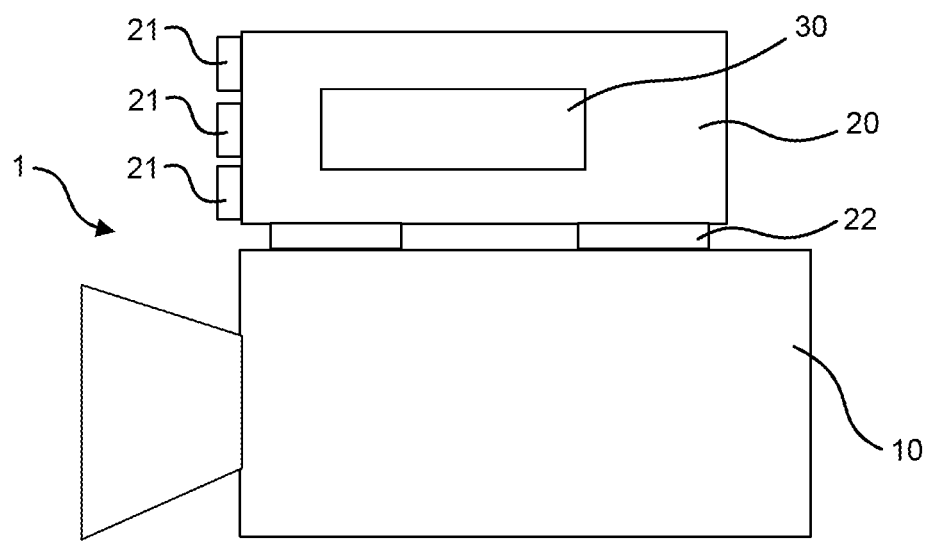
FIGS. 1a and 1b illustrate different embodiments of a monitoring camera system comprising a monitoring camera and an illuminator.
Figure 1B:
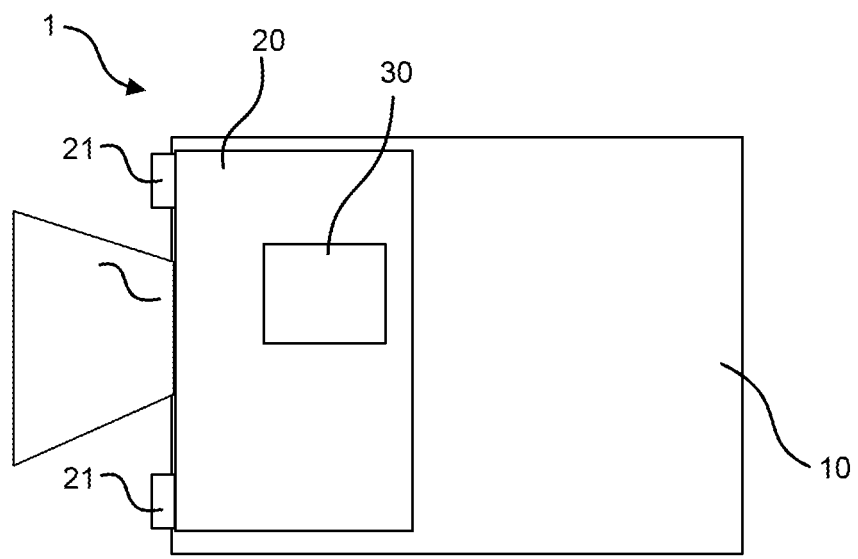

FIGS. 1a and 1b illustrate embodiments of a monitoring system 1. The monitoring system 1 comprises a monitoring camera 10 and an illuminator 20. The monitoring camera 10 is typically a digital video camera. The monitoring camera 10 is configured to monitor a scene. The illuminator 20 is configured to illuminate the scene monitored by the monitoring camera 10. The illuminator comprises one or more light sources 21. Each light source 21 is configured to emit light. The light emitted by the one or more light sources 21 forms a beam of illumination emitted by the illuminator 20. The one or more light sources 21 may be LED-based light sources. The illuminator 20 may be an IR-illuminator. The one or more light sources 21 of the illuminator may hence be IR-LEDs. The illuminator 20 is controlled by a controller 30. The controller 30 may, as in the examples shown in FIGS. 1a and 1b, form part of the illuminator 20. Especially, the controller 30 is configured to control a power of illumination delivered by the illuminator 20. The controller 30 may control other features of the illuminator 20 as well. For example, the controller 30 may control a width of the beam of illumination emitted by the illuminator 20. The controller 30 may control the beam of illumination emitted by the illuminator 20 so that it adapts to a zoom setting of the monitoring camera 10. By this the entire field of view of the monitoring camera may be evenly illuminated. According to another example, the controller 30 may individually control the one or more light sources 21 of the illuminator 20.

The monitoring camera 10 and the illuminator 20 may, as illustrated in FIG. 1a, be in the form of separate devices. The illuminator 20 may be mounted to the monitoring camera 10 using an illuminator mount 22. The illuminator 20 may as well be arranged at a distance from the camera 10. One or more illuminators may in this way be used for illuminating the scene monitored by the camera. Alternatively, the illuminator 20 may, as illustrated in FIG. 1b, form an integral part of the monitoring camera 10.

Figure 2:
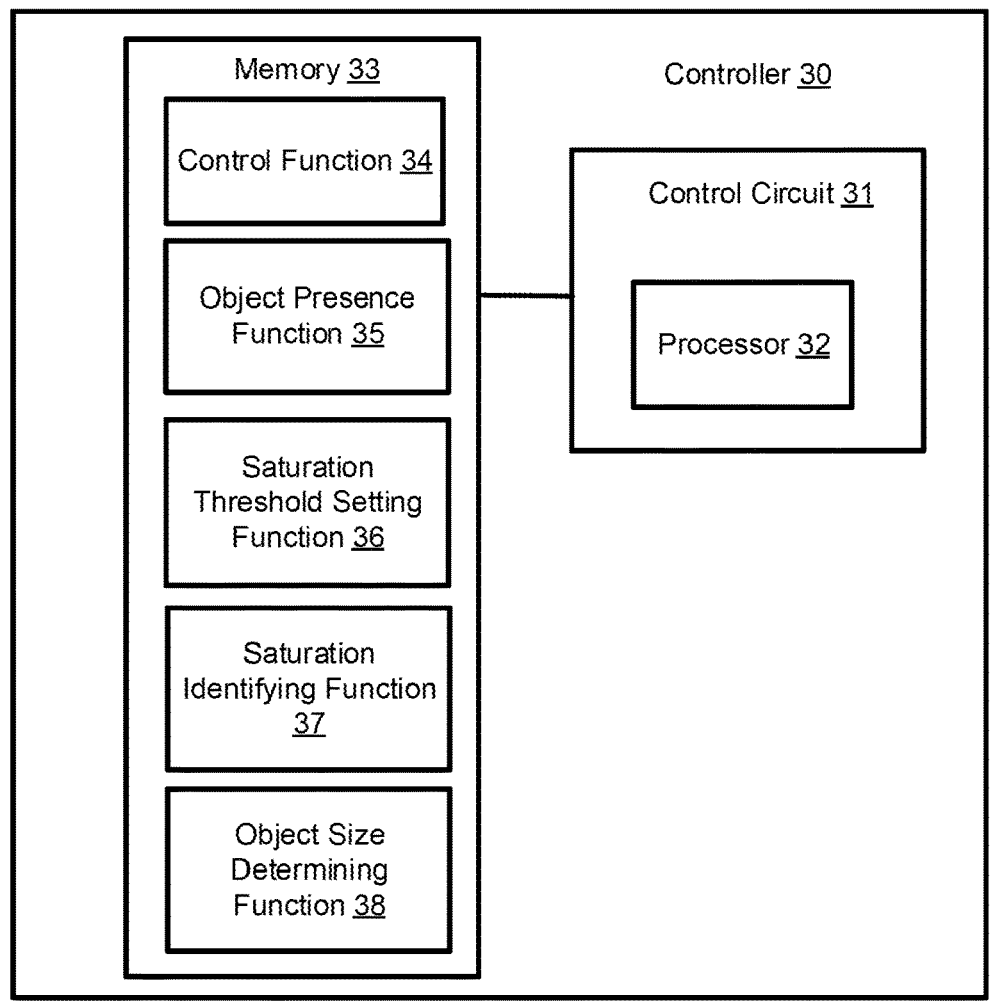
FIG. 2 is a schematic block diagram of a controller configured to control the illuminator.

In connection with FIG. 2, the controller 30 configured to control the illuminator 20 will be discussed in more detail. The controller comprises a control circuit 31 and a memory 33.

The control circuit 31 is configured to carry out overall control of functions and operations of the controller 30. The control circuit 31 may include a processor 32, such as a central processing unit (CPU), microcontroller, or microprocessor. The processor 32 is configured to execute program code stored in the memory 33, in order to carry out functions and operations of the control unit 30.

The memory 33 may be one or more of a buffer, a flash memory, a hard drive, a removable medium, a volatile memory, a non-volatile memory, a random access memory (RAM), or another suitable device. In a typical arrangement, the memory 33 may include a non-volatile memory for long term data storage and a volatile memory that functions as system memory for the control circuit 31. The memory 33 may exchange data with the control circuit 31 over a data bus. Accompanying control lines and an address bus between the memory 33 and the control circuit 31 also may be present.

Functions and operations of the controller 30 may be embodied in the form of executable logic routines (e.g., lines of code, software programs, etc.) that are stored on a non-transitory computer readable medium (e.g., the memory 33) of the controller 30 and are executed by the control circuit 31 (e.g., using the processor 32). Furthermore, the functions and operations of the controller 30 may be a stand-alone software application or form a part of a software application that carries out additional tasks related to the controller 30. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The control circuit 31 is configured to execute an object presence function 35. The object presence function 35 is configured to determine whether an object of interest is present in the scene monitored by the monitoring camera 10. Object detection is a well-known technology related to computer vision and image processing that deals with detecting objects, e.g., of a certain class (such as humans, buildings, or cars) in digital images and videos and will not be discussed in any detail herein. Object detection may be based on image data. Hence, the object presence function 35 may use image data from one or more images captured by the monitoring camera 10 as input data in the process of determining whether an object of interest is present in the scene. Alternatively, or in combination, the object presence function 35 may use data from an additional sensor, such as a radar, as input data in the process of determining whether an object of interest is present in the scene. According to a non-limiting example, the object presence function 35 may be configured to detect presence of a human in the scene.

The control circuit 31 is configured to execute a saturation threshold setting function 36. The saturation threshold setting function 36 is configured to set a saturation threshold. The saturation threshold is to be used to check whether the power of the illuminator 20 is to be limited or not. The saturation threshold may be saved in a memory, e.g. the memory 33 of the controller 30. The saturation threshold setting function 36 is configured to set the saturation threshold depending on input from the object presence function 35. Upon an input from the object presence function 35 indicating that at least one object of interest is present in the scene, the saturation threshold setting function 36 is configured to set the saturation threshold to a first value. Upon an input from the object presence function 35 indicating that no object of interest is present in the scene, the saturation threshold setting function 36 is configured to set the saturation threshold to a second value. The second value is lower than the first value. The first value is set to be 5-25%, preferably 7-15%, more preferably 10%, of a total area of the field of view of the monitoring camera 10, i.e. of a total area of an image captured by the monitoring camera 10. The second value is set to be 1-15%, preferably 3-10%, more preferably 5%, of the total area of the field of view of the monitoring camera 10, i.e. of the total area of an image captured by the monitoring camera 10.

Figure 3:
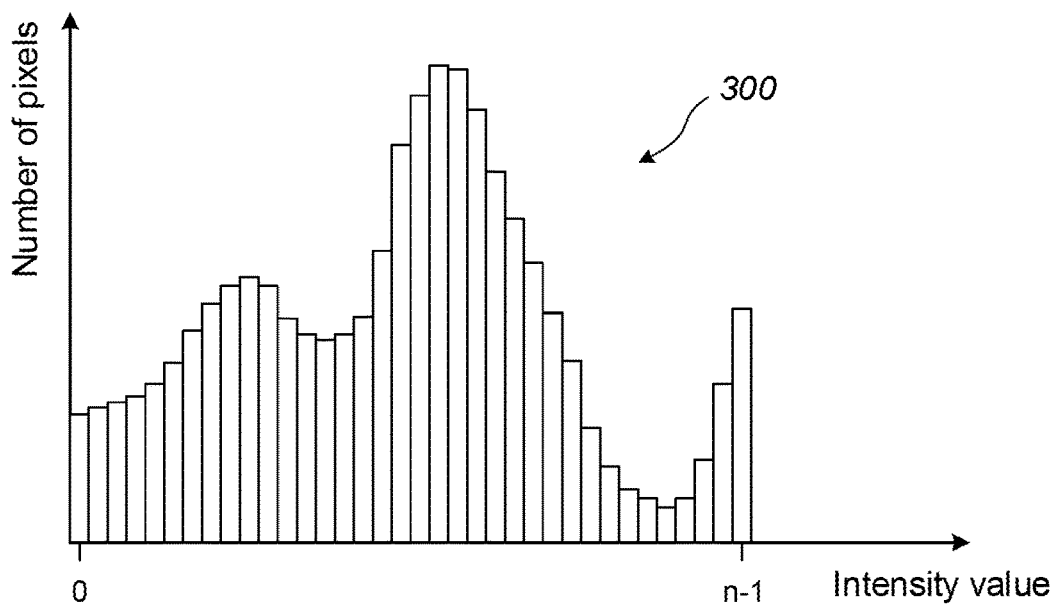
FIG. 3 schematically illustrates an intensity histogram of an example image captured by the monitoring camera.

The control circuit 31 is configured to execute a saturation identifying function 37. The saturation identifying function 37 is configured to identify saturated pixels in an image, of the scene, captured by the monitoring camera 10. The saturated pixels may comprise completely saturated pixels in the image. Alternatively, or in combination, the saturated pixels may correspond to the pixels in a few bins (e.g., two or three bins), at the upper end of an intensity range, in a histogram of intensity values of the pixels in the image. FIG. 3 illustrates a histogram 300 of intensity values of the pixels in an example image of the scene, captured by the monitoring camera 10. In the histogram 300 the range of possible intensity values is divided into a plurality of bins, here illustrated by bins indexed by 0 . . . n−1. For example, there may be 256 bins. Hence, the saturated pixels may correspond to the pixels in the two or three bins at the upper end of the intensity range.

The saturation identifying function 37 is further configured to determine a saturated area of the field of view of the monitoring camera 10, i.e. a saturated area in the image captured by the monitoring camera 10. The saturated area may be expressed as a number of saturated pixels. When determining the saturated area, saturated pixels not belonging to a big enough cluster of pixels may be disregarded. For example, only saturated pixels belonging to a cluster of 10 or more adjacent pixels may be regarded when determining the saturated area. In doing so, only saturation originating from one or more specific clustered areas of the field of view of the monitoring camera 10 will be regarded as the saturated area. This is since it will typically be more annoying or damaging if the saturation is concentrated in one or more clustered areas than if the saturated pixels are spread more evenly in the image.

The saturation identifying function 37 is further configured to determine a ratio between the saturated area and a total area of the field of view of the monitoring camera 10. Differently expressed, the saturation identifying function 37 is configured to determine a ratio between the saturated area of an image captured by the monitoring camera 10 and a total area of the image. This may, e.g., be done by determining a ratio between a number of saturated pixels and a total number of pixels in the image.

The control circuit 31 is configured to execute a control function 34. The control function 34 is configured to control the power of illumination delivered by the illuminator 20. The control function is configured to control the power of illumination delivered by the illuminator 20 based on the saturation threshold, set by the saturation threshold setting function 36, and the ratio between the saturated area and the total area of an image, determined by the saturation identifying function 37. Upon the ratio being above the saturation threshold, the control function 34 is configured to decrease the power of the illuminator. The decrease may be a decrease of 10%, 25%, 50% or any other suitable value. The decrease may possibly be repeatedly made in steps of, e.g. 10%, 25% or 50%, until the ratio becomes lower than the saturation threshold. Hence, the control of the power of illumination from the illuminator 20 may be a recursive control. Possibly, the size of steps could be proportional to the overshoot over the saturation threshold, such that the decrease is done in larger steps if the ratio is far above the saturation threshold and in smaller steps if the ratio is only slightly above the saturation threshold.

The control function 34 may further be configured to, upon the ratio being below the saturation threshold by a first margin, increase the power of the illuminator 20. The margin may, e.g., be 1% of the total area of the field of view of the monitoring camera 10. The increase may be an increase of 10%, 25%, 50% or any other suitable value. The increase may possibly be repeatedly made in steps of, e.g. 10%, 25% or 50%, until the ratio approaches the saturation threshold. Hence, the control of the power of illumination from the illuminator 20 may be recursive control. Possibly, the size of steps could be proportional to the undershoot under the saturation threshold.

The control circuit 31 may be configured to execute an object size determining function 38. The object size determining function 38 is configured to determine a size of an object of interest. The object of interest is typically found by the object presence function 35. The object size may be measured in a percentage of the image or scene covered by the object of interest. The object size may be based on a number of pixels constituting the object of interest. The saturation threshold setting function 36 may further be configured to set the saturation threshold based on the object size. Upon the object size being equal to or below a size threshold, the saturation threshold setting function 36 is configured to set the saturation threshold to the first value. Upon the object size being above the size threshold, the saturation threshold setting function 36 is configured to set the saturation threshold to a third value being lower than the first value. The third value may be equal to the second value. The size threshold may be a preset threshold. The size threshold may be set by an operator of the monitoring system 1. The size threshold may be set during set up of the monitoring system 1.

Figure 4:
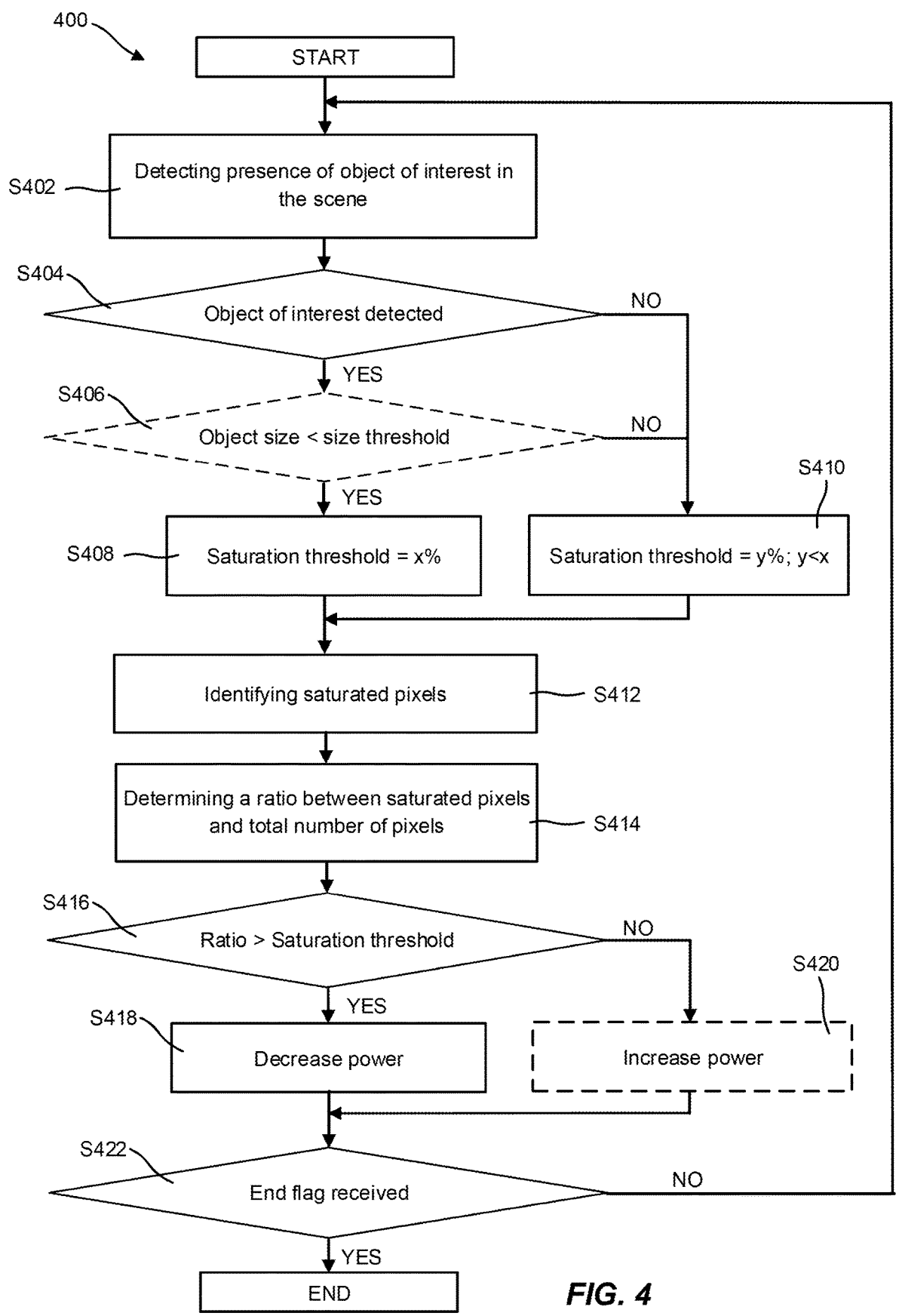
FIG. 4 is a block scheme of a method for controlling the illuminator illuminating a scene monitored by the monitoring camera.

In connection with FIG. 4 a method 400 for controlling the illuminator 20 will be discussed. The method 400 is based on the insight made by the inventors that a saturation threshold used for determining if a degree of illumination from the illuminator 20 is to be decreased or not is to be set differently depending on whether an object of interest exists in the scene monitored by the monitoring camera 10 whose field of view is illuminated by the illuminator 20. Typically, the illuminator 20 is an IR-illuminator. The saturation threshold is typically set to a higher value upon an object of interest existing in the scene as compared to upon no object of interest existing in the scene. The steps of the method 400 may be performed by the functions of the controller 30 described above. However, it is equally realized that some or all of the steps of the method 400 may be performed by similar functions performed at other devices.

At step S402, it is detected whether one or more objects of interest is present in the scene. The objects of interest may be set to belong to a specific class of objects. According to a non-limiting example, the objects of interest is set to be humans. The object of interest detection is typically made by analyzing one or more images captured by the monitoring camera 10 monitoring the scene. Each time the step 402 is performed, new images of the scene may be used.

At step S404, it is determined whether an object of interest is detected.

Upon no object of interest being determined to be present, the saturation threshold is set S410 to the second value. The second value is here indicated with y %. The saturation threshold is discussed in more detail above. In order to avoid undue repetition, reference is made to the above.

Upon at least one object of interest being determined to be present, the saturation threshold is typically set S408 to the first value. The first value is here indicated with x %. The first value is higher than the second value. However, the method 400 may comprise the additional steps of determining an object size of the at least one object of interest and comparing S406 the object size of the at least one object of interest with a size threshold. The size threshold is discussed in more detail above. In order to avoid undue repetition, reference is made to the above. Upon the object size being below the size threshold, the saturation threshold is set S408 to the first value. Upon the object size being equal to or above the size threshold, the saturation threshold is set to a third value being lower than the first value. The third value is typically equal to the second value. However, the third value may be another value than the second value as long as the third value is lower than the first value.

At step S412, saturated pixels in one or more images of the scene are identified. Typically, the one or more images of the scene are the same images as were used in step S402. However, it is not necessarily so. What is considered to be saturated pixels is discussed above. In order to avoid undue repetition, reference is made to the above.

At step S414, a ratio between a saturated area comprising the saturated pixels and a total area of the image is determined. This may, e.g., be made by determining a ratio between the number of saturated pixels and the total number of pixels. The ratio may also be referred to as a rate of halation in the image of the scene.

At step S416, the ratio determined at step S414 is compared with the saturation threshold set at step S408 or S410. Upon the ratio being above the saturation threshold, the degree of illumination from the illuminator 20 is decreased S418. Optionally, upon the ratio being below the saturation threshold, a degree of illumination from the illuminator 20 is increased S420. At step S422, a check is made whether an end flag has been received.

Upon the end flag having been received the method 400 is ended. Upon no end flag being received, the method starts over again at step S402. Hence, the method 400 may be seen as a recursive method.

Figure 5:
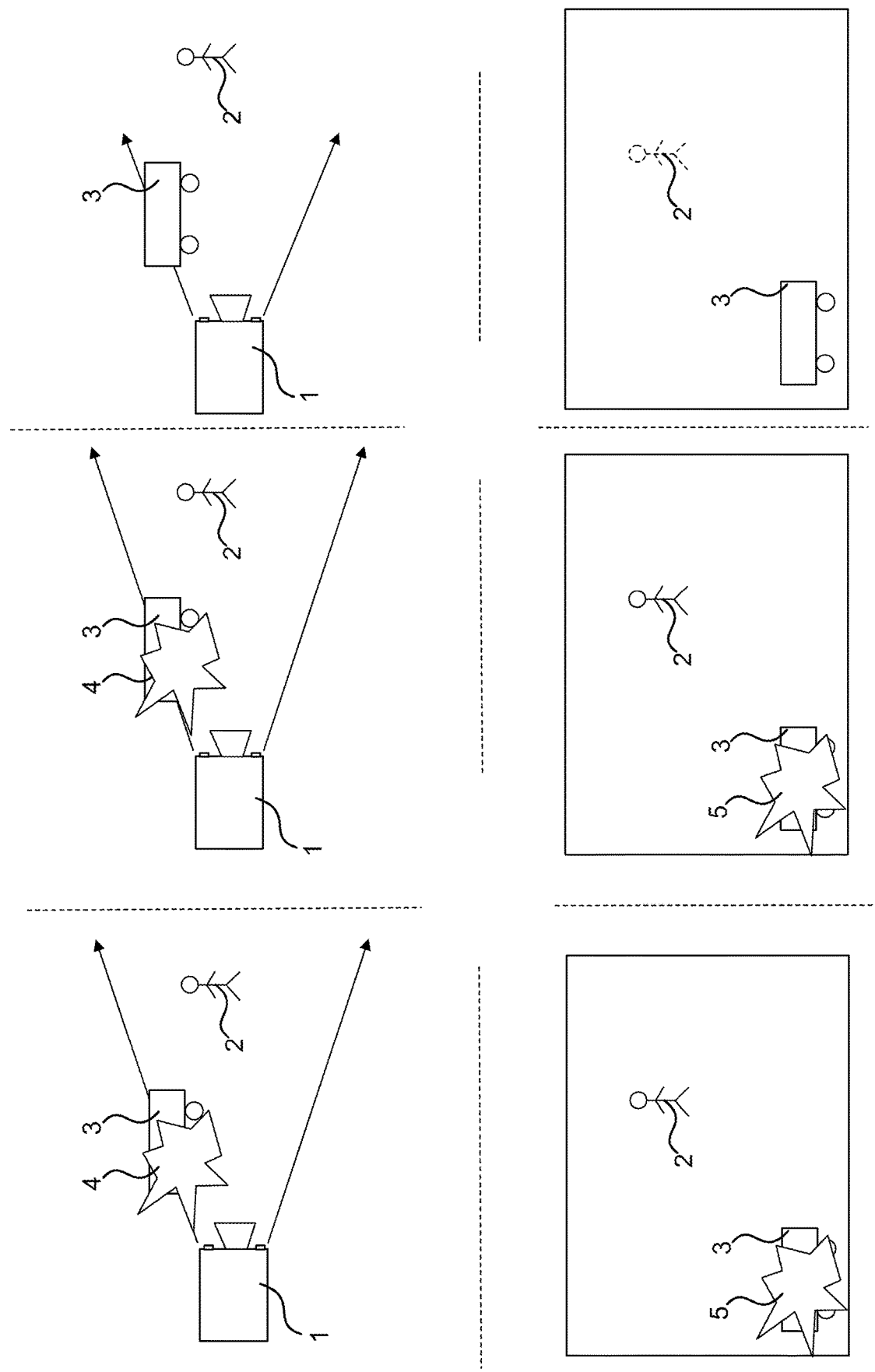
FIGS. 5, 6, 7a and 7b illustrates different scenarios for setting a saturation threshold.

In connection with FIG. 5, different scenarios for setting the saturation threshold and how the setting is influencing images captured of the scene will be discussed. In the upper portions of FIG. 5 different set-ups of the monitoring system 1 are illustrated. In the lower portions of FIG. 5 images captured by the corresponding set-up of the monitoring system 1 directly above are illustrated.

In connection with the left and middle portions of FIG. 5 the present embodiment will be discussed. Using the set-up of the monitoring system 1 as illustrated in the upper left portion of FIG. 5 the presence of an object of interest 2 has been detected in the scene monitored by the monitoring system 1. As a response thereto the saturation threshold is set to the first value. In this example the saturation threshold is set to be 10% of the total area of the field of view of the monitoring camera 10 of the monitoring system 1. The illumination of the illuminator 20 is illustrated by the two arrows. The illuminator 20 is set to illuminate the scene monitored by the monitoring camera 10. The illuminator 20 is set to illuminate at least the portion of the scene viewed by the monitoring camera 10. In the scene also another object 3, in this case a car, is present. The another object 3 is not an object of interest. The another object 3 is reflecting 4 light emitted from the illuminator 20 such that many of the pixels of images captured by the monitoring camera 10 become saturated. The saturated portion 5 of the image is in this case determined to be 7% of the total area of the field of view of the monitoring camera 10. Hence, since the saturation threshold is set to be 10%, well above the present 7%, no change of power of the illuminator 20 is made and subsequent images of the scene will look like in the middle lower portion of FIG. 5. This since, no alteration of the set-up of the monitoring system 1 is made. Especially, no decrease in power for the illuminator 20. Accordingly, the object of interest 2 will still be well seen in the images of the scene.

However, if on the other hand a prior art monitoring system would have been used, no consideration would have been made whether an object of interest is present in the scene. Consequently, a traditional global and probably lower saturation threshold would have been set in order to avoid saturation. A typical value may be 5%. The effect of such a prior art set saturation threshold is illustrated in the right portion of FIG. 5. Since the saturation threshold now is 5% the power of the illuminator 20 would have been decreased. This is illustrated in the set-up of the upper right portion of FIG. 5 where the power of the illuminator has been halved, illustrated by the shorter arrows. As a consequence, the object of interest 2 would not have been as well illuminated by the illuminator 20 and it would not have been as well seen in the images of the scene. This is illustrated in the lower right portion of FIG. 5.

In connection with FIG. 6 another scenario for setting the saturation threshold and how the setting is influencing images captured of the scene will be discussed. In the upper portions of FIG. 6 set-ups of the monitoring system 1 are illustrated. In the lower portions of FIG. 6 images captured by the corresponding set-up of the monitoring system 1 directly above are illustrated.

Figure 6:
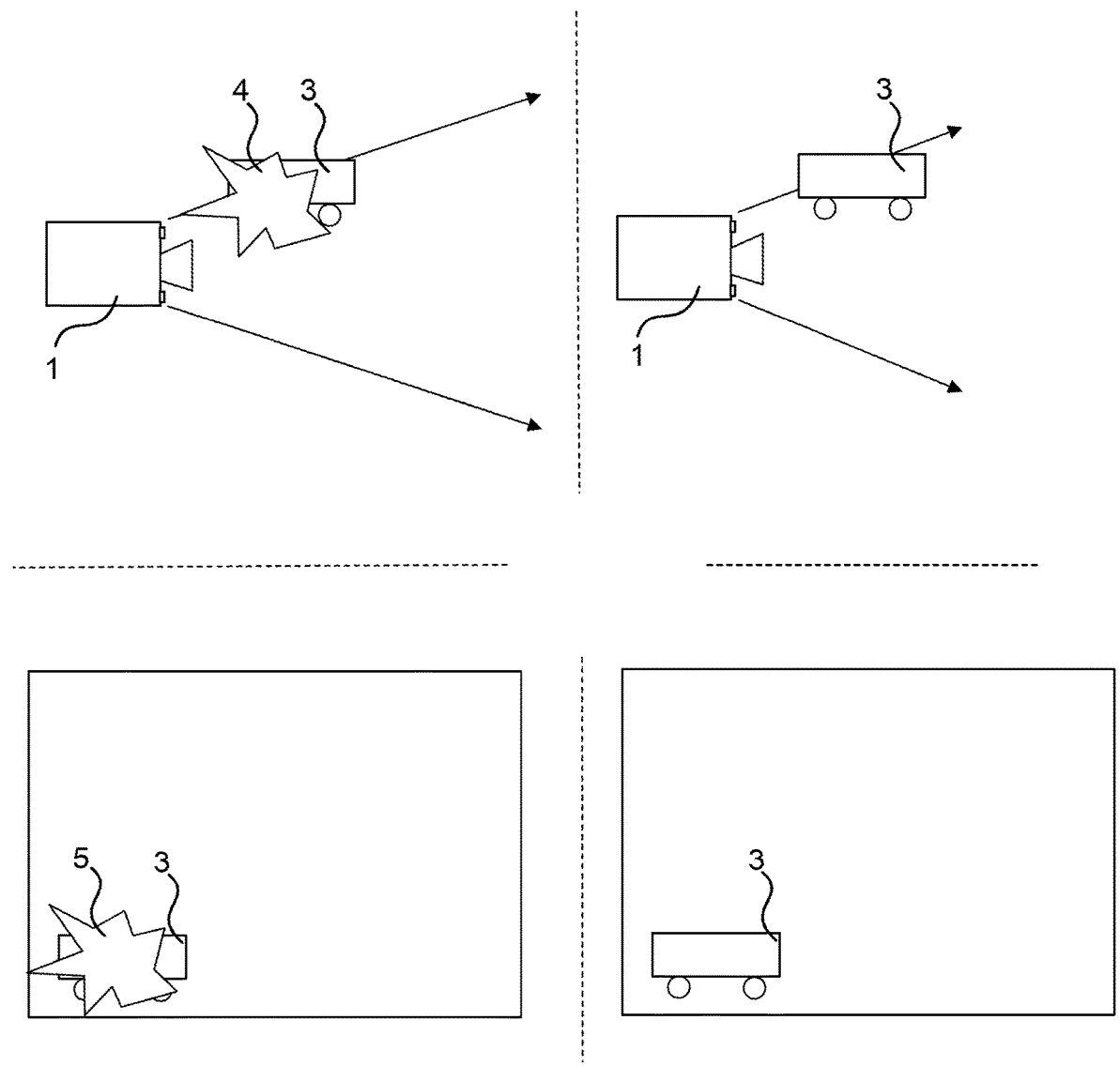

Using the set-up of the monitoring system 1 as illustrated in the upper left portion of FIG. 6 no presence of an object of interest has been detected in the scene monitored by the monitoring system 1. As a response thereto the saturation threshold is set to the second value. In this example the saturation threshold is set to be 5% of the total area of the field of view of the monitoring camera 10 of the monitoring system 1. The illumination of the illuminator 20 is illustrated by the two arrows. The illuminator 20 is set to illuminate the scene monitored by the monitoring camera 10. The illuminator 20 is set to illuminate at least the portion of the scene viewed by the monitoring camera 10. In the scene also another object 3, in this case a car, is present. The another object 3 is not an object of interest. The another object 3 is reflecting 4 light emitted from the illuminator 20 such that many of the pixels of images captured by the monitoring camera 10 becomes saturated. The saturated portion 5 of the image is in this case determined to be 7% of the total area of the field of view of the monitoring camera 10. Since the saturation threshold now is 5% the power of the illuminator 20 is to be decreased. This is illustrated in the set-up of the upper right portion of FIG. 6 where the power of the illuminator has been halved, illustrated by the shorter arrows. As a consequence, the number of saturated pixels in the images now captured by the monitoring system has been reduced. This is illustrated in the example image in the lower right portion of FIG. 6.

In connection with FIGS. 7a and 7b, further different scenarios for setting the saturation threshold and how the setting is influencing images captured of the scene will be discussed. In the upper portions of FIGS. 7a and 7b different set-ups of the monitoring system 1 are illustrated. In the lower portions of FIGS. 7a and 7b images captured by the corresponding set-up of the monitoring system 1 directly above are illustrated.

Figure 7A:
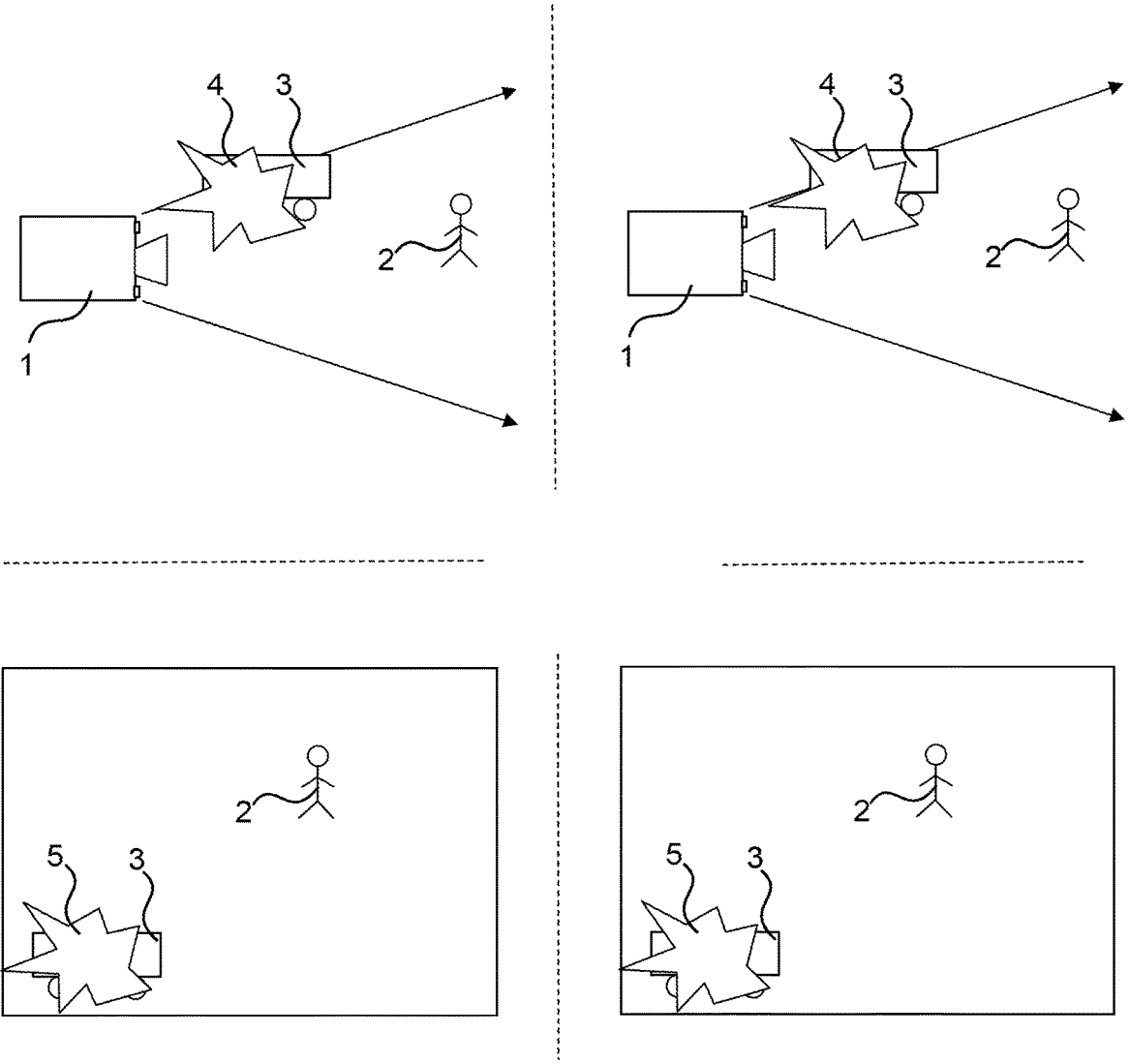

Using the set-up of the monitoring system 1 as illustrated in the upper left portion of FIG. 7a the presence of an object of interest 2 has been detected in the scene monitored by the monitoring system 1. Further, it has been determined that an object size of the object of interest 2 is below the size threshold. The size threshold is discussed above, and reference is made thereto. That the object size of the object of interest 2 is below the size threshold is an indication of that the object of interest is far away from the monitoring camera 10. As a response thereto the saturation threshold is set to the first value. In this example the saturation threshold is set to be 10% of the total area of the field of view of the monitoring camera 10 of the monitoring system 1. The illumination of the illuminator 20 is illustrated by the two arrows. The illuminator 20 is set to illuminate the scene monitored by the monitoring camera 10. The illuminator 20 is set to illuminate at least the portion of the scene viewed by the monitoring camera 10. In the scene also another object 3, in this case a car, is present. The another object 3 is not an object of interest. The another object 3 is reflecting 4 light emitted from the illuminator 20 such that many of the pixels of images captured by the monitoring camera 10 become saturated. The saturated portion 5 of the image is in this case determined to be 7% of the total area of the field of view of the monitoring camera 10. Hence, since the saturation threshold is set to be 10%, well above the present 7%, no change of power of the illuminator 20 is made and subsequent images of the scene will look like in the lower right portion of FIG. 7a. This since, no alteration of the set-up of the monitoring system 1 is made. Especially, no decrease in power for the illuminator 20. Accordingly, the object of interest 2 will still be well seen in the images of the scene.

Figure 7B:
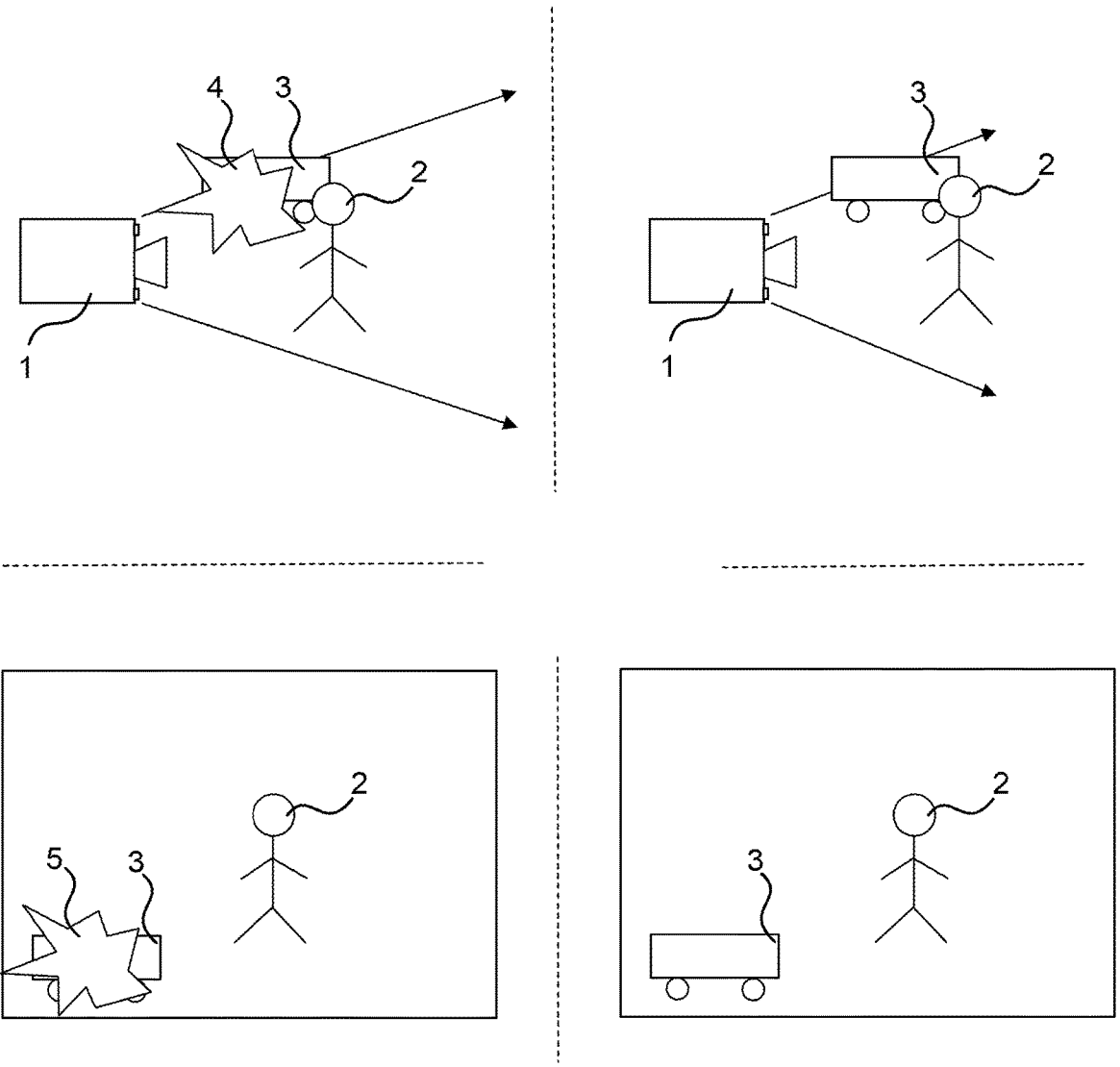

Using the set-up of the monitoring system 1 as illustrated in the upper left portion of FIG. 7b the presence of an object of interest 2 has been detected in the scene monitored by the monitoring system 1. Further, it has been determined that an object size of the object of interest 2 is equal to or above the size threshold. The size threshold is discussed above, and reference is made thereto. That the object size of the object of interest 2 is equal to or above the size threshold is an indication of that the object of interest is close to the monitoring camera 10. As a response thereto the saturation threshold is set to the third value being below the first value. As discussed above, the third value may be equal to the second value. In this example the saturation threshold is set to be 5% of the total area of the field of view of the monitoring camera 10 of the monitoring system 1. The illumination of the illuminator 20 is illustrated by the two arrows. The illuminator 20 is set to illuminate the scene monitored by the monitoring camera 10. The illuminator 20 is set to illuminate at least the portion of the scene viewed by the monitoring camera 10. In the scene also another object 3, in this case a car, is present. The another object 3 is not an object of interest. The another object 3 is reflecting 4 light emitted from the illuminator 20 such that many of the pixels of images captured by the monitoring camera 10 become saturated. The saturated portion 5 of the image is in this case determined to be 7% of the total area of the field of view of the monitoring camera 10. Since the saturation threshold now is 5% the power of the illuminator 20 will be decreased. This is illustrated in the set-up in the upper right portion of FIG. 7b where the power of the illuminator has been halved, illustrated by the shorter arrows. As a consequence, the saturation in the images of the scene will be reduced or even removed. This is illustrated in the lower right portion of FIG. 7b. Hence, upon the object of interest being big, indicating that the object of interest is close, the threshold may be set more similar, or even equal, to when there is no object of interest in the scene. This may lead to less saturation being accepted before the illumination is decreased compared to when a small, distant object of interest, is present. However, since the object of interest probably is close, it may be properly lit anyway.

The person skilled in the art realizes that the present disclosure by no means is limited to the preferred embodiments described above. On the contrary, many modifications and variations are possible within the scope of the appended claims.

For example, instead of, or as a complement to, using an object size threshold, an object distance threshold may be used. Accordingly, the control circuit 31 may be configured to execute an object distance determining function. The object distance determining function is configured to determine a distance to an object of interest. The object distance may be measured in a distance to the object of interest from the illuminator 20 or monitoring camera 10. The saturation threshold setting function 36 may further be configured to set the saturation threshold based on the object distance. Upon the object distance being above a distance threshold, the saturation threshold setting function 36 is configured to set the saturation threshold to the first value. This is the scenario when the object of interest is far away from the monitoring system 1. Upon the object distance being equal to or above the distance threshold, the saturation threshold setting function 36 is configured to set the saturation threshold to a third value being lower than the first value. This is the scenario when the object of distance is close to the monitoring system 1. The third value may be equal to the second value. The distance threshold may be a preset threshold. The distance threshold may be set by an operator of the monitoring system 1. The distance threshold may be set during set up of the monitoring system 1.

Additionally, variations to the disclosed embodiments can be understood and effected by the skilled person in practicing the claimed invention, from a study of the drawings, the disclosure, and the appended claims.

The invention claimed is:

1. A method for controlling an illuminator illuminating a scene monitored by a camera, the method comprising:
   determining whether an object of interest belonging to a specific class of objects is present in the scene;
   upon at least one object of interest being determined to be present in the scene, setting a saturation threshold to a first value;
   upon no object of interest being determined to be present in the scene, setting the saturation threshold to a second value being lower than the first value;
   identifying saturated pixels in an image of the scene captured by the camera;
   determining a ratio between a saturated area comprising the saturated pixels and a total area of the image; and
   upon the ratio being above the saturation threshold, decreasing the power of the illuminator.

2. The method according to claim 1, further comprising:
   determining an object size of the at least one object of interest,
   upon the object size being below a size threshold, setting the saturation threshold to the first value;
   upon the object size being equal to or above the size threshold, setting the saturation threshold to a third value being lower than the first value.

3. The method according to claim 2, wherein the third value is equal to the second value.

4. The method according to claim 2, wherein the size of the object of interest is determined from an image captured by the camera.

5. The method according to claim 1, wherein the first value is set to be 5-25%, preferably 7-15%, more preferably 10%, of the total area of the image and wherein the second value is set to be 1-15%, preferably 3-10%, more preferably 5%, of the total area of the image.

6. The method according to claim 1, further comprising upon the ratio being below the saturation threshold by a first margin, increasing the degree of illumination from the illuminator.

7. The method according to claim 1, wherein the illuminator is an IR-illuminator.

8. A non-transitory computer readable recording medium having computer readable program code recorded thereon which when executed on a device having processing capability is configured to perform the method of claim 1.

9. A controller configured to control an illuminator illuminating a scene monitored by a camera, the controller comprising a control circuit configured to execute:
   a control function configured to control a power of the illuminator;
   an object presence function configured to determine whether an object of interest is present in the scene, wherein the object of interest is belonging to a specific class of objects;
   a saturation threshold setting function configured to:
      upon at least one object of interest being determined to be present in the scene, set a saturation threshold to a first value,
      upon no object of interest being determined to be present in the scene, set the saturation threshold to a second value being lower than the first value; and
   a saturation identifying function configured to:
      identify saturated pixels in an image of the scene captured by the camera, and
      determine a ratio between a saturated area comprising the saturated pixels and a total area of the image;
   wherein the control function is further configured to, upon the ratio being above the saturation threshold, decrease the power of the illuminator.

10. The controller according to claim 9,
   wherein the control circuit is further configured to execute an object size determining function configured to determine an object size of the at least one object of interest; and
   wherein the saturation threshold setting function is further configured to:
      upon the object size being below a size threshold, setting the saturation threshold to the first value,
      upon the object size being equal to or above the size threshold, setting the saturation threshold to a third value being lower than the first value.

11. The controller according to claim 9, wherein the object presence function is configured to detect whether an object of interest is present in the scene from an image captured by the camera.

12. The controller according to claim 9, wherein the first value is set to be 5-25%, preferably 7-15%, more preferably 10%, of the total area of the image and wherein the second value is set to be 1-15%, preferably 3-10%, more preferably 5%, of the total area of the image.

13. The controller according to claim 9, wherein the control function is further configured to, upon the ratio being below the saturation threshold by a first margin, increase the power of the illuminator.

14. The controller according to claim 9, wherein the controller is implemented in the camera.

15. The controller according to claim 9, wherein the illuminator is an IR-illuminator.

* * * * *